(12) United States Patent
Vinje

(10) Patent No.: US 10,191,165 B2
(45) Date of Patent: Jan. 29, 2019

(54) USING AN OFFSET VECTOR TILE GATHER TO IMAGE A SUBSURFACE

(71) Applicant: CGG SERVICES SA, Massy (FR)

(72) Inventor: Vetle Vinje, Oslo (NO)

(73) Assignee: CGG SERVICES SAS, Massy (FR)

( * ) Notice: Subject to any disclaimer, the term of this patent is extended or adjusted under 35 U.S.C. 154(b) by 372 days.

(21) Appl. No.: 14/993,579

(22) Filed: Jan. 12, 2016

(65) Prior Publication Data

US 2016/0202369 A1    Jul. 14, 2016

Related U.S. Application Data

(60) Provisional application No. 62/102,734, filed on Jan. 13, 2015.

(51) Int. Cl.
| | |
|---|---|
| *G01V 1/00* | (2006.01) |
| *G01V 1/28* | (2006.01) |
| *G01V 1/36* | (2006.01) |
| *G01V 1/38* | (2006.01) |

(52) U.S. Cl.
CPC ............... *G01V 1/28* (2013.01); *G01V 1/36* (2013.01); *G01V 1/3808* (2013.01)

(58) Field of Classification Search
CPC .......... G01V 1/28; G01V 1/36; G01V 1/3808; G01V 1/282; G01V 1/303; G01V 2200/14; G01V 2210/614; G01V 1/305; G01V 2210/51

See application file for complete search history.

(56) References Cited

U.S. PATENT DOCUMENTS

| | | | | |
|---|---|---|---|---|
| 5,343,441 A | * | 8/1994 | Alford | G01V 1/003 367/75 |
| 5,517,463 A | * | 5/1996 | Hornbostel | G01V 1/20 367/13 |
| 5,761,152 A | * | 6/1998 | Jacobsen | G01V 1/3808 181/110 |

(Continued)

OTHER PUBLICATIONS

Cary, "Common-offset-vector gathers: An alternative to cross-spreads for wide-azimuth 3-D surveys", SEG Technical Program Expanded Abstracts, Nov. 1999, pp. 1496-1499.*

(Continued)

*Primary Examiner* — Robert Bachner
(74) *Attorney, Agent, or Firm* — Patent Portfolio Builders PLLC

(57) ABSTRACT

A method for using an offset vector tile gather to image a subsurface defines an offset vector tile gather by selecting a plurality of seismic traces from recorded seismic data. Each seismic trace in the offset vector tile includes reflections from subsurface reflectors and reflection points at depths below the surface of the subsurface. Each reflection point is in a given seismic trace, and each given seismic trace extends from a seismic source to a seismic receiver. The reflection points define an offset vector tile having a source line span and a receiver line span. The source line span is equal to or greater than a distance between adjacent seismic receiver lines, and the receiver line span is less than a distance between adjacent seismic source lines. The offset vector tile gather is used to produce a three dimensional image of the subsurface.

20 Claims, 14 Drawing Sheets

(56) References Cited

U.S. PATENT DOCUMENTS

| | | | | |
|---|---|---|---|---|
| 7,391,673 | B2* | 6/2008 | Regone | G01V 1/3808 367/16 |
| 8,488,409 | B2* | 7/2013 | Hill | G01V 1/3808 367/15 |
| 9,103,942 | B2* | 8/2015 | Moldoveanu | G01V 1/3817 |
| 9,405,029 | B2* | 8/2016 | Howieson | G01V 1/3808 |
| 9,435,903 | B2* | 9/2016 | Bones | G01V 1/32 |
| 9,733,371 | B2* | 8/2017 | Burnett | G01V 1/30 |
| 2010/0139927 | A1* | 6/2010 | Bakulin | G01V 1/36 166/369 |
| 2014/0140174 | A1* | 5/2014 | Lu | G06F 12/08 367/73 |
| 2014/0301158 | A1* | 10/2014 | Zhang | G01V 1/34 367/7 |
| 2015/0063066 | A1* | 3/2015 | Burnett | G01V 1/30 367/38 |

OTHER PUBLICATIONS

Li, "An introduction to common offset vector trace gathering", CSEG Recorder, Nov. 2008, pp. 28-34.*

V. Vinje, et al.; "Offset Vector Tile gather extension and weighting to reduce footprint in dual-datum and converted-wave migration"; Society of Exploration Geophysicists; 2015 SEG Annual Meeting; Oct. 18-23, 2015; SEG-2015-5899618; pp. 1-4; New Orleans, Louisiana.

R. Bale, et al.; "The Design and Application of Converted-wave COVs"; CSEG GeoConvention 2013, Expanded Abstract, May 6-12, 2013; pp. 1-6; AAPG Search and Discover Article #90187; CSPG/CSEG/CWLS; Integration: Geoscience Engineering Partnership.

P. W. Cary; "Common-offset-vector gathers: an alternative to cross-spreads for wide-azimuth 3-D surveys" 69th Ann. Int'l Conf. and Exhibition. SEG, Expanded Abstract; 1999; pp. 1496-1499; The CREWES Project and Geophysical Ltd.

J. G. Gaiser; "General Definition of Reflection-point Coverage for P- and PS-wave COV data"; 76th EAGE Conference and Exhibition, Extended Abstract, D202; Jun. 16-19, 2014; pp. 1-5. Amsterdam, RAI, The Netherlands.

R. R. Stewart, et al.; "Application and Interpretation of Converted Waves"; SEG Continuing Education Course; 2011; p. 1.

G. J. O. Vermeer; "Creating image gathers in the absence of proper common-offset gathers"; Exploration Geophysics (ASEG Conference issue) 29; 1998; pp. 636-642.

Extended Search Report in corresponding European Application No. EP 16 30 5027 dated Jun. 10, 2016. (Reference D1 was previously submitted with an Information Disclosure Statement on Feb. 8, 2016.).

* cited by examiner

USING AN OFFSET VECTOR TILE GATHER TO IMAGE A SUBSURFACE

CROSS REFERENCE TO RELATED APPLICATIONS

This application claims priority and benefit from U.S. Provisional Patent Application No. 62/102,734, filed Jan. 13, 2015, for "COV Muting Technique", the entire contents of which is incorporated herein by reference.

TECHNICAL FIELD

Embodiments of the subject matter disclosed herein generally relate to methods and systems for imaging and characterizing a subsurface using a seismic data acquisition system.

BACKGROUND

Seismic data acquisition surveys include both land and seabed surveys that utilize seismic receivers arranged in a pattern or grid on either the land or seabed. The seismic receivers or seismic nodes are attached at various points along the length of a cable, and the seismic data acquisition grid is defined by placing multiple cables in spaced parallel lines. The seismic receivers can also be arranged on the sea bottom in independent nodes. The seismic sources or seismic shots are then created by towing or driving one or more seismic signal generators such as a seismic gun along tow lines or paths, e.g., shot lines, that are perpendicular to the arrangement of the parallel cables. The seismic signal generators are then actuated at multiple locations along the tow lines or paths and the resulting seismic signals are recorded at the seismic receivers on the cables or nodes. The recorded seismic signals are then processed to yield a three dimensional (3D) image of the subsurface below the seismic data acquisition grid.

One signal processing technique that has been used for 3D seismic surveys and in particular 3D wide azimuth surveys is common-offset vector (COV) binning. COV binning was introduced almost simultaneously in Vermeer G. J. O., "Creating Image Gathers in the Absence of Proper Common-Offset Gathers", Exploration Geophysics (ASEG Conference Issue) 29, pp. 636-642 (1998), Vermeer G. J. O., "3-D Seismic Survey Design", Society of Exploration Geophysics, Geophysical References 12 (2002) and Cary, P. W., "Common-Offset-Vector Gathers: An Alternative to Cross-Spreads for Wide-Azimuth 3D Surveys", 69th Am. Int. Conf. and Exhib. SEG, Expanded Abstract, pp. 1496-99 (1999) as an alternative to cross-spread binning for 3D wide-azimuth surveys. Conventional cross-spread processing assumes that reflection points and common mid-points (CMPs) share the same lateral location. However, ocean-bottom data and mode-converted PS-waves violate this assumption. Corrections for illumination area distortion in COV processing of PS-waves have been proposed in Stewart and Gaiser, "Application and Interpretation of Converted Waves", SEG Continuing Education Course (2011), Bale et al., "The Design and Application of Converted-Wave COVs", CSEG GeoConvention, Expanded Abstract, pp. 1-6 (2013) and Gaiser, J. G., "General Definition of Reflection-Point Coverage for P- and PS-Wave COV Data", 76th EAGE Conf. and Exhibition, Extended Abstract D202 (2014).

Common-offset vector (COV) binning provides single-fold datasets that can be migrated with surface offset and azimuth preserved. The latter allows post-migration processing such as radon demultiple or azimuthal residual moveout flattening to enhance the quality of the final stacked image. Single fold coverage enables each COV volume to produce a clean image with limited migration operator artefacts, but only for surveys with sources and receivers on the same acquisition datum and with a single mode arrival having symmetric ray paths in a flat earth (such as P-waves). Irregular subsurface illumination for dual-datum acquisition or mode-converted PS-wave data causes artifacts in migration of COV binned data, including acquisition footprints associated with the seismic receiver cables. The resulting 3D image of the subsurface contains a footprint of the seismic data acquisition seismic that obscures the 3D image of the subsurface.

Therefore, the need exists for improved methods for processing seismic data recorded using a grid of seismic sensors attached to multiple seismic cables that removes or corrects the footprint of the cables appearing in the resulting 3D image of the subsurface. These methods would utilize an improved COV process.

SUMMARY

Embodiments are directed to method and systems to reduce or eliminate the artifacts in a 3D image of a subsurface associated with the footprint of the seismic receiver cables or nodes. COV illumination for PP- and PS-waves of various geometries is addressed to improve reflection point distribution within a COV image. Recorded data are binned into gathers corresponding to each offset vector tile (OVT), and time and velocity-model dependent weighting and muting functions are computed for each OVT gather in such a way that uniform illumination is obtained at all levels beneath a reference level. By this process, the cable/node footprints are suppressed in the 3D image of the subsurface. As opposed to previous attempts at improving COV processing of seismic data, time-dependent corrections of offset vector tile (OVT) gathers are applied for orthogonal cross-spread PS-wave land data and for PP- or PS-wave marine data of dual-datum ocean-bottom geometries.

An embodiment is directed to a method for using an offset vector tile gather to image a subsurface. An offset vector tile gather is defined by selecting a plurality of seismic traces from recorded seismic data. Each seismic trace in the offset vector tile includes reflections from a plurality of subsurface reflectors such that the offset vector tile gather contains a plurality of reflection points at given depths below a surface of the subsurface. Each reflection point in the plurality of reflection points is disposed in a given seismic trace in the plurality of seismic traces. Each given seismic trace extends from a seismic source located in one of a plurality of seismic source lines to a seismic receiver located in one of a plurality of seismic receiver lines. The plurality of reflection points defines an offset vector tile having a source line span parallel to the plurality of seismic source lines and a receiver line span parallel to the plurality of seismic receiver lines. The source line span is equal to or greater than a distance between adjacent seismic receiver lines in the plurality of seismic receiver lines, and the receiver line span less than a distance between adjacent seismic source lines in the plurality of seismic source lines. The offset vector tile gather is used to produce a three dimensional image of the subsurface.

In one embodiment, a plurality of offset vector tile gathers are selected to define a plurality of non-overlapping offset vector tiles. Each offset tile is associated with one of the offset vector tile gathers. The plurality of offset vector tile gathers is used to produce the three dimensional image of the subsurface. In one embodiment, a unique plurality of seismic traces is selected from the recorded seismic data for each offset tile gather. Each offset vector tile gather contains a unique plurality of reflection points at given depths below a surface of the subsurface. In one embodiment, each seismic source associated with the plurality of seismic traces is located in a single common source line in the plurality of source lines, and each seismic receiver associated with the plurality of seismic traces is located in a single common receiver line in the plurality of seismic receiver lines.

In one embodiment, the plurality of seismic traces within the offset vector tile gather includes inner seismic traces and outer seismic traces. The outer seismic traces surround the inner seismic traces, and the outer seismic traces are muted. In one embodiment, the plurality of seismic traces includes a taper zone between the inner seismic traces and the outer seismic traces, and muting the outer seismic traces further includes varying the taper zone along at least one of the source line span and the receiver line span with a depth below the surface of the subsurface in accordance with a pre-defined taper, such as a cosine squared taper.

In one embodiment, each given seismic trace includes a common midpoint between the seismic source and the seismic receiver associated with the given seismic trace, and each seismic trace in the plurality of seismic traces is scaled by an inverse of a product between a ratio of density of reflection points and density of common midpoints for the source line span and the receiver line span. The ratio of density of reflection points and density of common midpoints is a function of depth below the surface of the subsurface and an offset between seismic sources and seismic receivers.

Embodiments are directed to a computing system for using an offset vector tile gather to image a subsurface. The computing system includes a storage device containing recorded seismic data for the subsurface and a processor in communication with the storage device. The processor is configured to define an offset vector tile gather by selecting a plurality of seismic traces from recorded seismic data. Each seismic trace in the offset vector tile includes reflections from a plurality of subsurface reflectors such that the offset vector tile gather contains a plurality of reflection points at given depths below a surface of the subsurface. Each reflection point in the plurality a reflection points is disposed in a given seismic trace in the plurality of seismic traces, and each given seismic trace extends from a seismic source located in one of a plurality of seismic source lines to a seismic receiver located in one of a plurality of seismic receiver lines. The plurality of reflection points define an offset vector tile containing a source line span parallel to the plurality of seismic source lines and a receiver line span parallel to the plurality of seismic receiver lines. The source line span is equal to or greater than a distance between adjacent seismic receiver lines in the plurality of seismic receiver lines, and the receiver line span less than a distance between adjacent seismic source lines in the plurality of seismic source lines. The processor is configured to use the offset vector tile gather to produce a three dimensional image of the subsurface.

In one embodiment, the processor is further configured to select a plurality of offset vector tile gathers to define a plurality of non-overlapping offset vector tiles by selecting a unique plurality of seismic traces from the recorded seismic data for each offset tile gather. Each offset vector tile gather contains a unique plurality of reflection points at given depths below a surface of the subsurface, and each offset tile is associated with one of the offset vector tile gathers. The processor is further configured to use the plurality of offset vector tile gathers to produce the three dimensional image of the subsurface.

In one embodiment, each given seismic trace includes a common midpoint between the seismic source and the seismic receiver associated with the given seismic trace, and the processor is further configured to scale each seismic trace in the plurality of seismic traces by an inverse of a product between a ratio of density of reflection points and density of common midpoints for the source line span and the receiver line span. The ratio of density of reflection points and density of common midpoints is a function of depth below the surface of the subsurface and an offset between seismic sources and seismic receivers. In one embodiment, the plurality of seismic traces includes a taper zone between the inner seismic traces and the outer seismic traces, and the processor is further configured to mute the outer seismic traces by varying the taper zone along at least one of the source line span and the receiver line span with a depth below the surface of the subsurface in accordance with a pre-defined taper.

In one embodiment, each given seismic trace includes a common midpoint between the seismic source and the seismic receiver associated with the given seismic trace. The processor is further configured to scale each seismic trace in the plurality of seismic traces by an inverse of a product between a ratio of density of reflection points and density of common midpoints for the source line span and the receiver line span, where the ratio of density of reflection points and density of common midpoints is a function of depth below the surface of the subsurface and an offset between seismic sources and seismic receivers.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to local activity taking place within the area of a seismic survey. However, the embodiments to be discussed next are not limited to this configuration, but may be extended to other arrangements that include regional activity, conventional seismic surveys, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
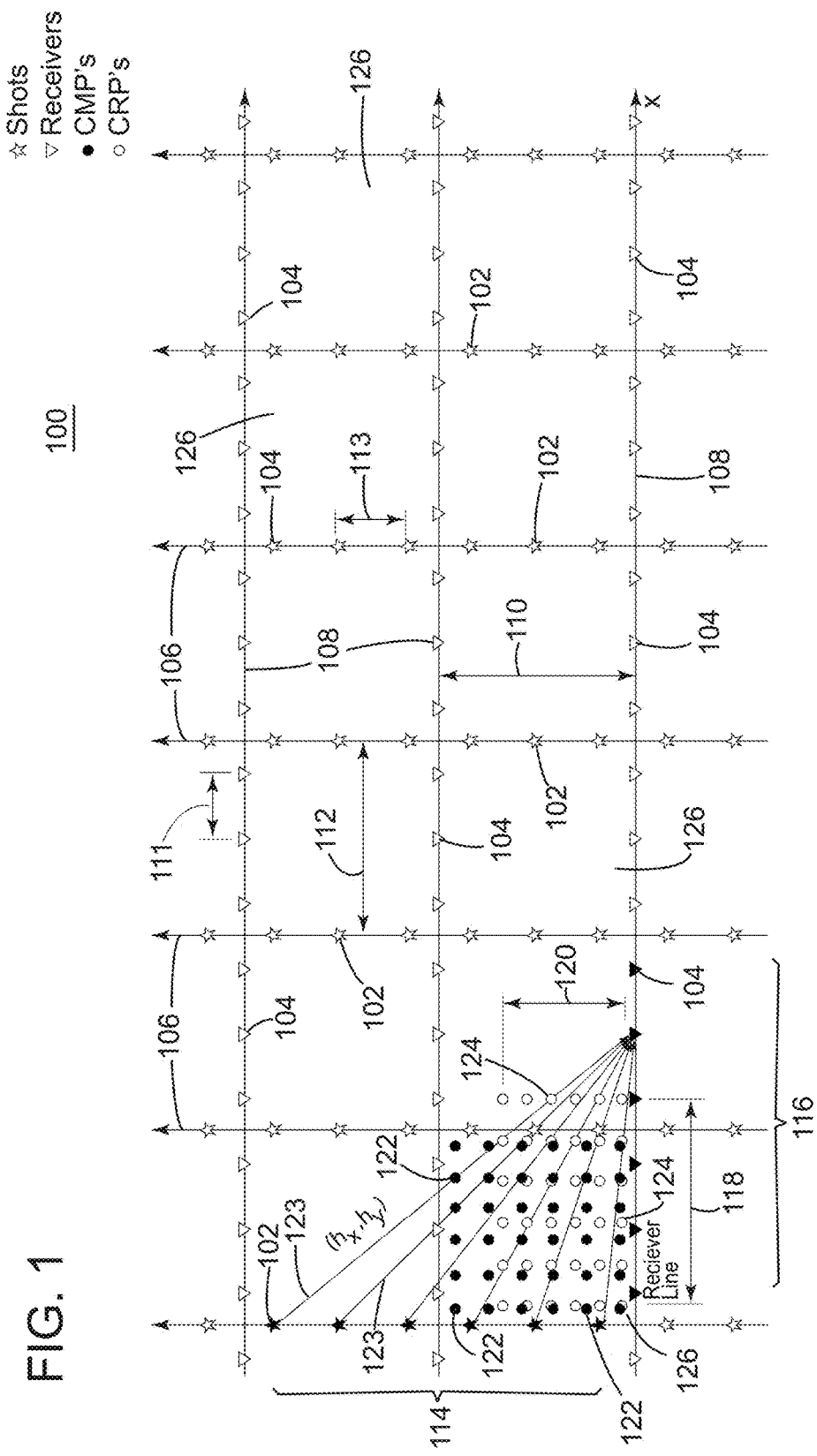
FIG. 1 is an illustration of an embodiment of seismic source lines and seismic receiver lines defining squares for common offset vector binning.

Referring initially to FIG. 1, an arrangement of a seismic data acquisition system that defines at least one offset vector tile (OVT) 100 is illustrated. Suitable seismic data acquisition systems include land based systems and marine based systems. The seismic data acquisition system includes a plurality of seismic sources or seismic shots 102 disposed and arranged along a plurality of seismic source lines 126. These seismic sources can be generated by any suitable seismic source generating device known and available in the art. Suitable seismic source lines include shots lines created using a towing vessel or a land-based vehicle. For a marine based seismic survey, the seismic source lines are located on the surface of the water or at a given depth below the surface of the water but above the seabed. The seismic source lines are arranged in parallel lines and include a distance between adjacent seismic source lines 112, which is denoted as $\Delta s_x$, because the seismic source lines or shot lines extend in the y direction and the distances between these lines are in the x direction. Along each individual seismic receiver lines, the distance between adjacent pairs of seismic sources 113 is given by $\delta s_y$. The distance between adjacent seismic source lines can be constant between all adjacent pairs of seismic source lines or can vary between adjacent pairs of seismic source lines. Similarly, the distance between adjacent pairs of seismic sources along the seismic source line can be constant or can vary along the length of the seismic source line.

The seismic data acquisition system also includes a plurality of seismic receivers 104. Suitable seismic receivers include any type of seismic receiver known and available in the art such as land based, surface and buried, seismic receivers and marine based, ocean bottom node and ocean bottom cable, seismic receivers. The seismic receivers are arranged along a plurality of seismic receiver lines 108. For a marine based seismic survey, the seismic receiver lines are located on the seabed. The seismic receiver lines are arranged in parallel lines and include a distance between adjacent seismic receiver lines 110, which is denoted as $\Delta r_y$, because the seismic receiver lines extend in the x direction and the distances between these lines are in the y direction. Along each individual seismic receiver lines, the distance between adjacent pairs of seismic receivers 111 is given by $\delta r_x$. The distance between adjacent seismic receiver lines can be constant between all adjacent pairs of seismic receiver lines or can vary between adjacent pairs of seismic receiver lines. Similarly, the distance between adjacent pairs of seismic receivers along the seismic receiver line can be constant or can vary along the length of the seismic receiver line.

The plurality of seismic source lines and the plurality of seismic receiver lines from a gird, for example a cross spread ocean-bottom acquisition arrangement, that defines a plurality of squares 126. This arrangement is used to generate seismic data for the subsurface located below the grid of squares. The generated and recorded seismic data include a plurality of seismic traces containing the reflected seismic waves from the subsurface. Each of these reflections are associated with a ray extending between a given seismic source and a given seismic receiver. As is understood in the art, each seismic ray extends from the seismic source into the subsurface to a reflection point on a reflector (i.e. an interface between two rocks) in the subsurface. The seismic ray then extends from the reflection point to the seismic receiver. Therefore, each seismic ray between a seismic source and a seismic receiver will include a reflection point. Since the seismic source and the seismic receiver are separated by a given distance in two dimensions, i.e., the x-y plane, there will also be a common midpoint (CMP) between each seismic source and each seismic receiver that is also associated with the seismic trace.

An OVT gather can be defined to include a plurality of seismic traces. As described herein, the subsurface is viewed as a series of densely separated, horizontal, plane reflectors. A seismic trace is a recording in a seismic receiver of the response from all these subsurface reflectors from an explosion or an air gun in a seismic source, i.e., source point. Each of these reflections from each reflector can be described by a seismic ray 123 connecting the seismic source and the seismic receiver. Each seismic ray reflects from a subsurface reflector in a reflection point, which is referred to as the Common Reflection Point (CRP) 124. As used herein, the subsurface reflectors are assumed to be flat and horizontal. Therefore, each seismic trace includes the response from many reflectors at different depths. For example, a reflector located at depth z=1000 m has an associated seismic ray with offset vector 123 ($h_x$, $h_y$). The ray is reflected from this reflector with a travel time of for instance t=1 s. A CRP can be computed for this seismic ray, and this is used to compute the mute function and scaling functions of the tile gather for this time. Another reflector located an depth z=2000 m will have another ray, another CRP and another travel time (for instance t=2 s), which is used to compute the muting and scaling function in the OVT gather corresponding to this travel time.

A standard-size OVT gather contains a plurality of seismic sources 114 and a plurality of seismic receivers 116. Each seismic source in the OVT gather extends along a single or common seismic source line, and each seismic receiver in the OVT gather extends along a single or common seismic receiver line. Each seismic ray 123 associated with the OVT gather extends from each seismic source and each seismic receiver. The horizontal projection of each seismic ray 123 is an offset vector from a seismic source to a seismic receiver and is given by h=($h_x$, $h_y$). Therefore, the overall size of this standard-size OVT gather in offset vector space is ($\Delta H_x$, $\Delta H_y$)=($2\Delta s_x$, $2\Delta r_y$). As illustrated, the seismic rays are illustrated for a single seismic receiver and each seismic source in the OVT gather. Similar seismic traces can also be drawn for each additional seismic receiver. A CMP 122 and a reflection point 124 are associated with each seismic ray.

Figure 2:
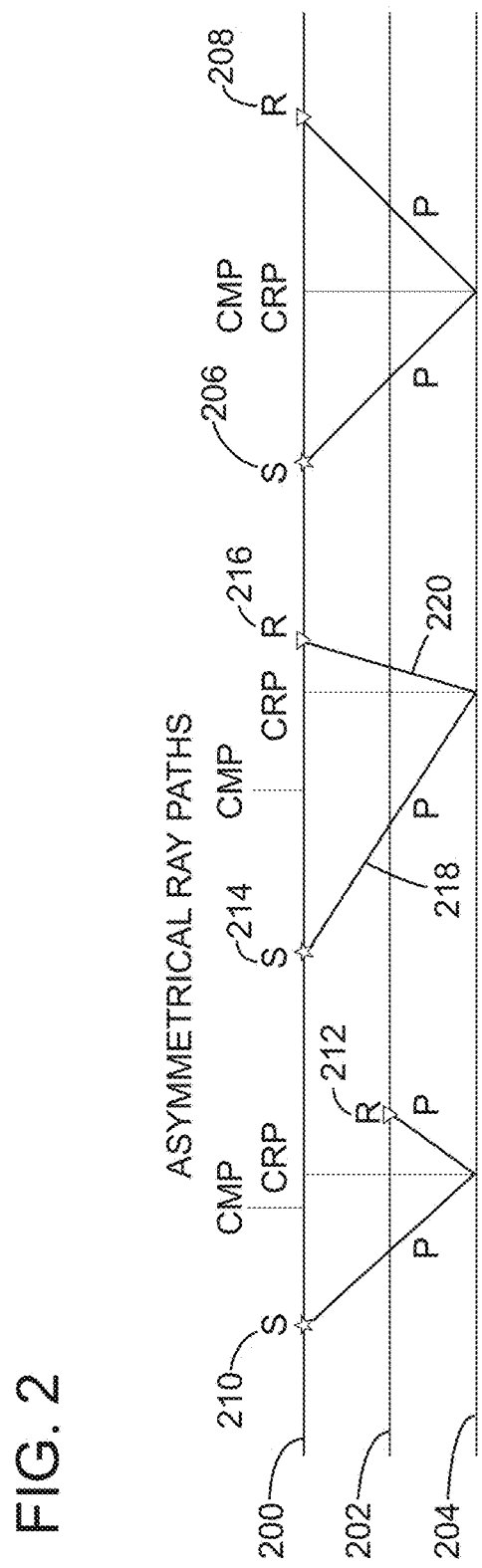
FIG. 2 is an illustration of symmetric and asymmetric ray paths for various shot and receiver datums and for PP (pressure waves) and PS (pressure waves reflected to shear waves) imaging.

Referring to FIG. 2, for marine-based seismic system having a source 206 located at the water surface 200 and a receiver 208 also located on the water surface, a ray path for a common type of seismic ray, i.e., P or S, will reflect from the reflecting surface 204 and define asymmetrical ray path with respect to the CMP between source and receiver. Given this symmetry, the reflection point (CRP) will also coincide with the CMP. Returning to FIG. 1, for the case of symmetric seismic rays, the CMP 122 and reflection point 124 of each seismic trace in the OVT gather will coincide and will fail within a given square 126 for the selected grouping of seismic sources and seismic receivers. Each square corresponds to an OVT.

However, as illustrated in FIG. 2, a given source 210 can be located on the surface of the water with the receiver 212 located on the seabed 202. Alternatively, the source 214 and receiver 216 are both located on the surface but the incident ray 218 is a different type (a compressional wave, or P wave) from the reflected ray 220 (a shear wave, also called an S wave). This produces an asymmetric ray path with the CMP and CRP being at different horizontal locations. As illustrated in FIG. 1, the CMP 122 and reflection point 124 for each seismic trace in a given OVT gather do not correspond. While the CMPs fall within a given square 126, the reflection points define a grid that extends outside of the square containing the CMPs.

For a given OVT, the center offset vector of the OVT can be illustrated as ($hm_x$, $hm_y$) with a tile size given by ($\Delta s_x$, $\Delta r_y$) and a bin size given by ($\delta r_x/2$, $\delta s_y/2$). As used herein the seismic traces in the OVT gather are referred to as a tile gather. The CMP increments between adjacent CMPs in the OVT, i.e., the distance moved in the x and y directions, is given by ($\delta m_x$, $\delta m_y$). Similarly, the reflection point increment between adjacent reflection points in the grid of reflection points in the OVT associated with the OVT gather is given by ($\delta c_x$, $\delta c_y$). In general, reflection point separation between adjacent reflection points is half the seismic source separation between adjacent seismic sources. In addition, the reflection points in the OVT gather form a grid having a source line span 120 that is parallel to the plurality of source line spans and a receiver line span 118 that is parallel to the plurality of receiver lines. Exemplary embodiments adjust the selection of the group containing a plurality of seismic sources 114 and the group containing a plurality of seismic receivers 116 in order to adjust the location and size of the source line span and the receiver line span for a given OVT gather. In particular, the source line span is set equal to or greater than a distance between adjacent seismic receiver lines in the plurality of seismic receiver lines, and the receiver line span is set less than a distance between adjacent seismic source lines in the plurality of seismic source lines. This eliminates the footprints of the lines of seismic receivers that appear in the 3D image of the subsurface.

Figure 3:
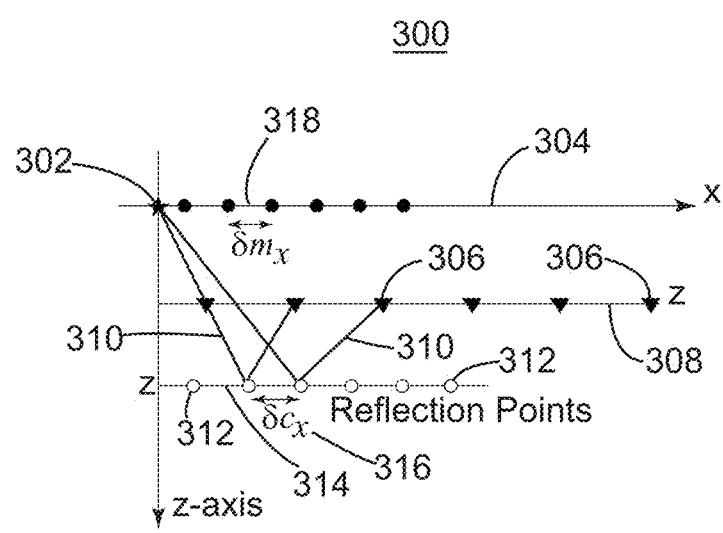
FIG. 3 is an illustration of a side view of seismic acquisition with sources, receivers and reflection points associated with a near-offset offset vector tile and offset vector tile gather.

As discussed above with respect to FIG. 2, for P-waves with sources and receivers on the same datum the standard OVT gather size ($\Delta H_x$, $\Delta H_y$) yields a single fold data set with even illumination of subsurface flat reflectors. However, for dual-datum acquisition, and/or for PS-waves, the reflection point and the CMP do not coincide. Referring to FIG. 3, the xz view 300 of the seismic acquisition system with a seismic source 302 at the surface 304 and a plurality of seismic receivers 306 at the water bottom 308 at a given depth zr is illustrated. The seismic traces or rays 310 reflect from reflection points 312 located on a reflector 314 at depthz. Due to the asymmetry of the ray paths the reflection point increment 316 given by $\delta c_x$ is larger than the CMP increment 318 given by $\delta m_x$. Reflection points are pushed towards the seismic receiver, creating an extended and shifted illuminated area in the x-direction. In the y-direction, not illustrated, $\delta c_y$ is less than $\delta m_y$, and again the reflection points are shifted towards the receiver, shrinking and shifting the illuminated area in this direction. The result is a reflection point area for this OVT containing the plurality of reflection points having the source line span 120 and the receiver line span 118 as illustrated in FIG. 1. The result of these reflection point areas that extend outside a given square is subsurface overlaps and non-illuminated zones when adjacent OVTs are migrated, which is a significant cause of imaging distortions and footprints. This distortion depends on the depth of the reflector. For a shallow reflector the distortion is large. As the depth of the reflector increases, the illuminated area of the reflector asymptotically approaches the standard tile size of ($\Delta s_x$, $\Delta r_y$).

Figure 4:
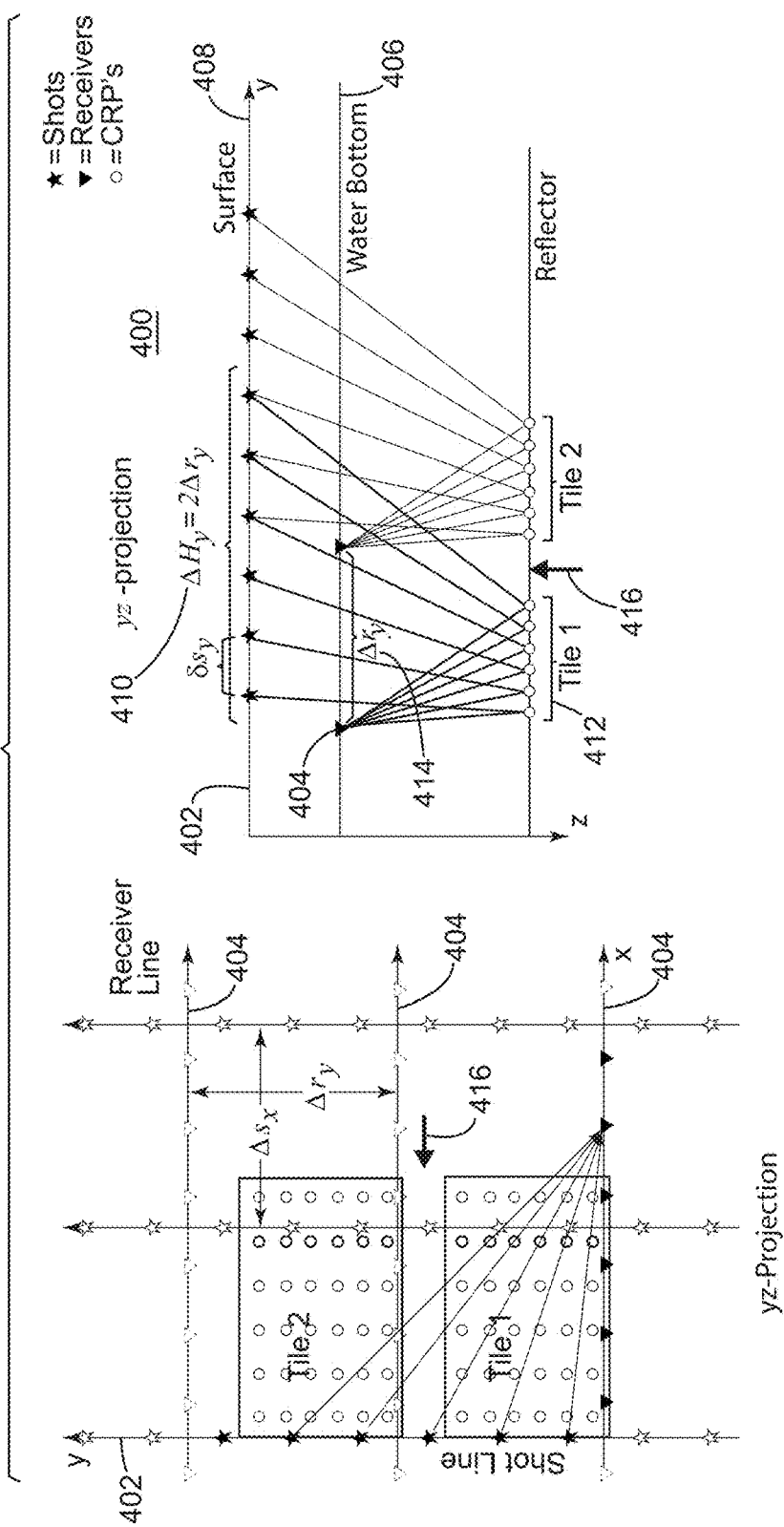
FIG. 4 is an illustration of a yz-projection of common offset vector binning using a conventionally sized tile gather and an indication of the lack of illumination shown by the black arrow.

Exemplary embodiments correct these illumination distortions using adjustments of the size of the OVT gather. In order to improve the illumination for a range of depth levels below the surface of a given subsurface, this adjustment is time-dependent. Referring now to FIG. 4, a yz projection 400 illustrating a single seismic source line 402, which extends in the y direction, and three seismic receiver lines 404, which extend in the x direction, is shown. The seismic receivers are located at the water bottom 406 at depth zr beneath the shot level 408, i.e., the surface.

Due to the different datums of sources and receivers, the standard OVT gather size of $\Delta H_y$ 410 equal to twice the distance of separation between seismic receiver lines is not sufficient to create complete illumination of the reflector at depthz. The width of the illuminated area 412 is less than the tile width $\Delta r_y$ 414. This results in holes or gaps 416 between adjacent illumination areas.

Figure 5:
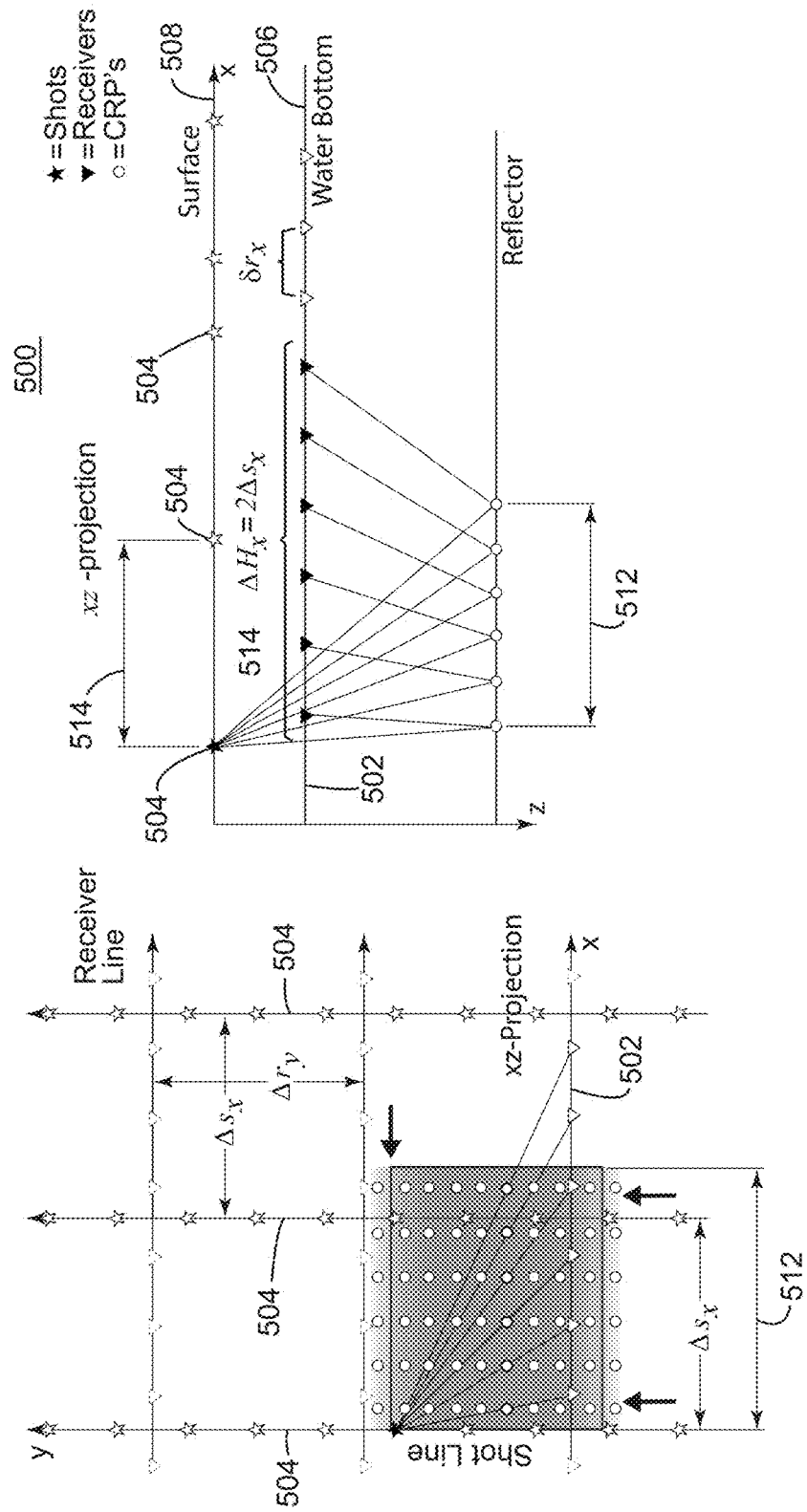
FIG. 5 is an illustration of a xz-projection of common offset vector binning using a conventionally sized tile gather.

Referring now to FIG. 5, a xz projection 500 illustrating a single seismic receiver line 502, which extends in the x direction, and three seismic source lines 504, which extend in the y direction, is shown. The seismic receivers are located at the water bottom 506 at depth zr beneath the shot level 508, i.e., the surface.

Due to the different datums of sources and receivers, the standard OVT gather size of $\Delta H_x$ 510 equal to twice the distance of separation between seismic source lines generates a width of the illuminated area 512 that is greater than the tile width $\Delta s_x$ 514. The result is illumination distortions in the xz projection.

Figure 6:
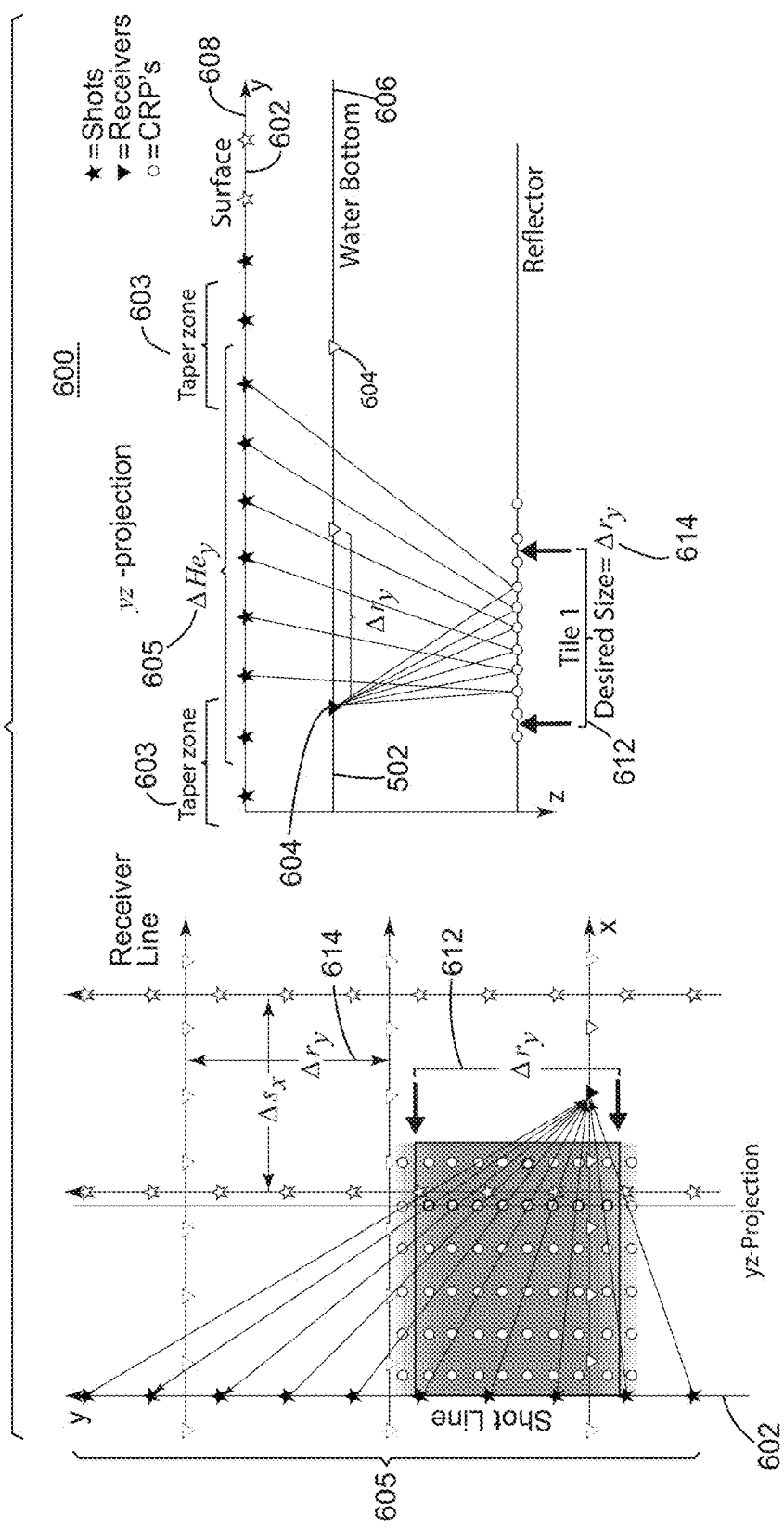
FIG. 6 is an illustration of a yz-projection of common offset vector binning using a modified tile gather.

Referring now to FIG. 6, a yz projection 600 illustrating a single seismic source line 602, which extends in the y direction, and multiple seismic receiver lines 604, which extend in the x direction, is shown in which the standard seismic source group size $\Delta H_y$ for a given OVT gather is extended to $\Delta He_y$ 605. The seismic receivers are located at the water bottom 606 at depth zr beneath the shot level 608, i.e., the surface. The additional length in $\Delta He_y$ is a function of the depth of the reflector, i.e., this additional length changes with the depth z of the reflector below the surface. The result is a width, i.e., a seismic source line span 605, giving an illuminated area 612 that is equal to or greater than the tile width $\Delta r_y$ 614, although this width may be shifted from alignment with the seismic receiver lines. This results in elimination overlaps between adjacent illumination areas.

In one embodiment, the extended gather also includes a taper zone 603 on either end of the line of seismic sources, adding more seismic traces into the OVT gather depending on the size of the taper zone 603. The traces in the extended OVT gather are muted outside the taper zone and tapered within the zone. In one embodiment, this taper is a cost taper.

Figure 7:
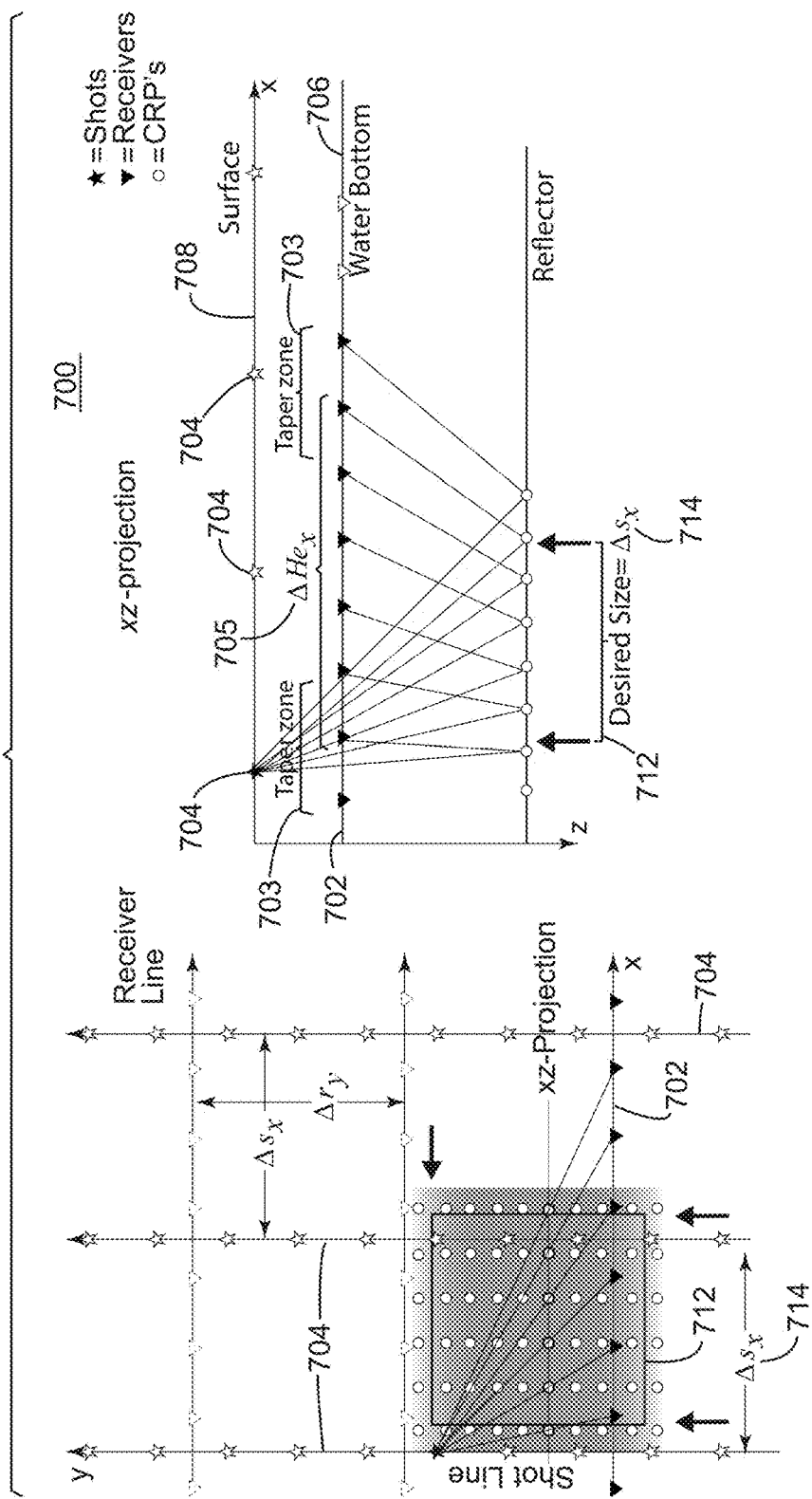
FIG. 7 is an illustration of a xz-projection of common offset vector binning using a modified tile gather.

Referring now to FIG. 7, a xz projection 700 illustrating a single seismic receiver line 702, which extends in the x direction, and multiple seismic source lines 704, which extend in the y direction, is shown in which in the x-direction the standard OVT gather size is adjusted. The seismic receivers are located at the water bottom 706 at depth zr beneath the shot level 708, i.e., the surface. The adjusted size of the seismic traces in the OVT gather $\Delta He_x$ 705 is smaller than $\Delta H_x$. Therefore, fewer seismic traces are included in the OVT gather. The result is a tile size 712 width, i.e., a seismic receiver line span, that is less than the tile width $\Delta s_x$ 714, although this width may be shifted from alignment with the seismic source lines. The adjusted size of the seismic traces in the OVT gather $\Delta He_x$ is a function of the depth of the reflector, i.e., this additional length changes with depth below the surface.

In one embodiment, the adjusted size of the seismic traces in the OVT gather $\Delta He_x$ includes a taper zone 703 on either end of the line of seismic receivers, adding more seismic traces into the OVT gather depending on the size of the taper zone 603. The traces in the extended OVT gather are muted outside the taper zone and tapered within the zone. In one embodiment, this taper is a $\cos^2$ taper.

The result is a modified OVT gather ($\Delta He_x$, $\Delta He_y$) that is inserted into a seismic migration used to generate a 3D image of the subsurface. As the actual size of this modified OVT gather varies with depth and time, a depth- and time-dependent OVT gather size ($\Delta He_x$, $\Delta He_y$) is defined that creates uniform illumination in all depth levels of the subsurface. These dependencies are defined using ratios $R_x$ and $R_y$ between the reflection point density and the CMP density. These ratios are given by:

$$R_x = \delta c_x/\delta m_x \text{ and } \delta c_y/\delta m_y, \quad (1)$$

where $R_x(z, h)$ and $R_y(z, h)$ are functions of depth z and offset vector $h=(h_x, h_y)$. In the practical computation of $R_x$ and $R_y$, a local 1D model is assumed in each tile center (x, y)-position, as described below. The extension factors $\Delta He_x$ and $\Delta He_y$ are given by the solution to the integrals $$\int_{hm_x - \frac{\Delta He_x}{2}}^{hm_x + \frac{\Delta He_x}{2}} R_x(z, h_x, h_y) dh_x = \Delta H_x, \text{ and} \quad (2)$$

$$\int_{hm_y - \frac{\Delta He_y}{2}}^{hm_y + \frac{\Delta He_y}{2}} R_y(z, h_x, h_y) dh_y = \Delta H_y$$

As can be seen from equation (2), $\Delta He_x = \Delta He_x(z, hm_x, h_y)$ and $\Delta He_y = \Delta He_y(z, hm_y, h_x)$. For the special case when $\delta c = \delta m$, symmetrical ray paths exist and $R_x = R_y = 1$, giving $\Delta He_x = \Delta H_x$ and $\Delta He_y = \Delta H_y$. Thus, for symmetrical ray paths, there is no need to extend (or shrink) the size of the OVT gather relative to the standard OVT gather size.

In the practical implementation of OVT gather extension and weighting $R_x$ and $R_y$ in equation (1) are computed using ray tracing in local 1D velocity models. The 1D model is extracted from the vertical column of the 3D migration model in the spatial (x, y) centre of each OVT. As an alternative, analytical approximations in 1D models can also be implemented, see, Gaiser, J. G., "General Definition of Reflection-Point Coverage for P- and PS-Wave COV Data", 76th EAGE Conf. and Exhibition, Extended Abstract D202 (2014). These approximations are a function of the velocity ratios of downgoing to upgoing rays (VP/VS in the case of PS-waves).

Figure 8:
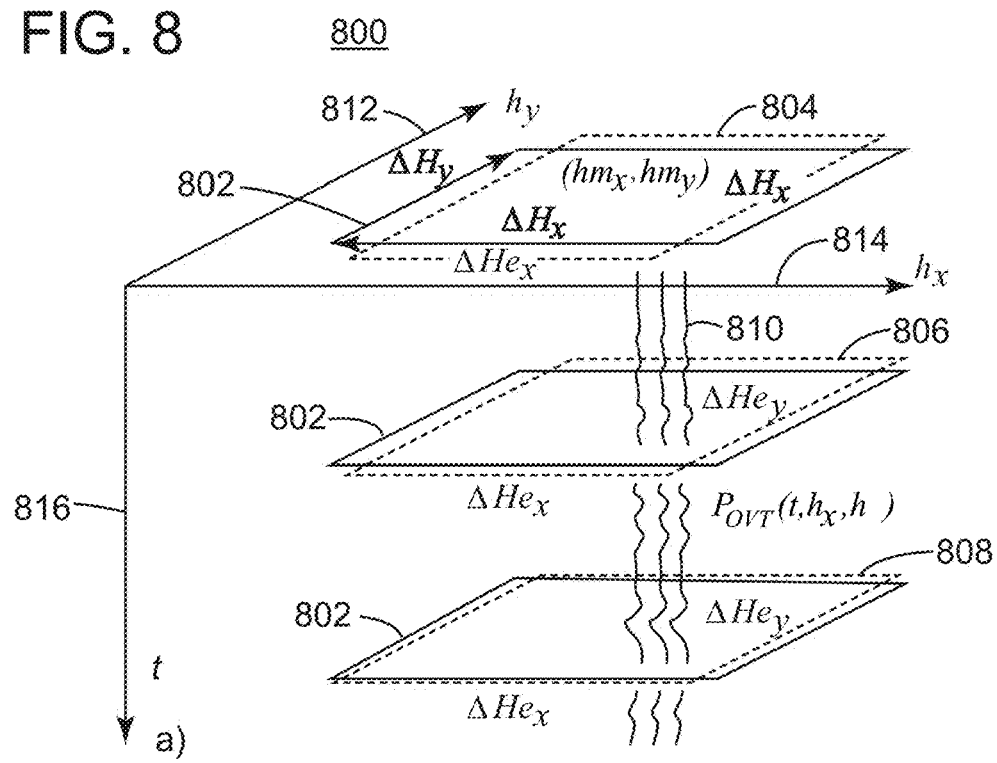
FIG. 8 is an illustration of the size of the offset vector tile gather varying in size with recording time.

Ray tracing is also used in the 1D model to find the mapping from time to depth, z(t, h). The functions $\Delta He_x(z, hm_x, h_y)$, $\Delta He_y(z, hm_y, h_x)$, $R_x(z, h)$, $R_y(z, h)$ and z(t, h) are then used to generate the extended OVT gather. Referring to FIG. 8, an illustration of an OVT gather 800 is provided. A standard non-modified OVT gather 802 containing a plurality of seismic traces 810 is illustrated several times (corresponding to various depths of reflectors below the subsurface). The standard OVT gather size, $\Delta H_x$ and $\Delta H_y$, remains constant for all times, t 816. This is compared to the modified, time-dependent OVT gather, which is illustrated at a shallow time-level 804, a deeper time level 806 and an even deeper time level 808. This time dependent outline of the non-muted part of the modified OVT gather produces uniform illumination at variable depths. As the modified OVT gather extends in time and depth the x offset ($h_x$) 812 and y offset ($h_y$) 814 along the horizontal axes converge with the non-modified OVT gather 802. The outline is given by the time-dependent $\Delta He_x$ and $\Delta He_y$ centered on the central offset $hm_x$, $hm_y$.

Figure 9:
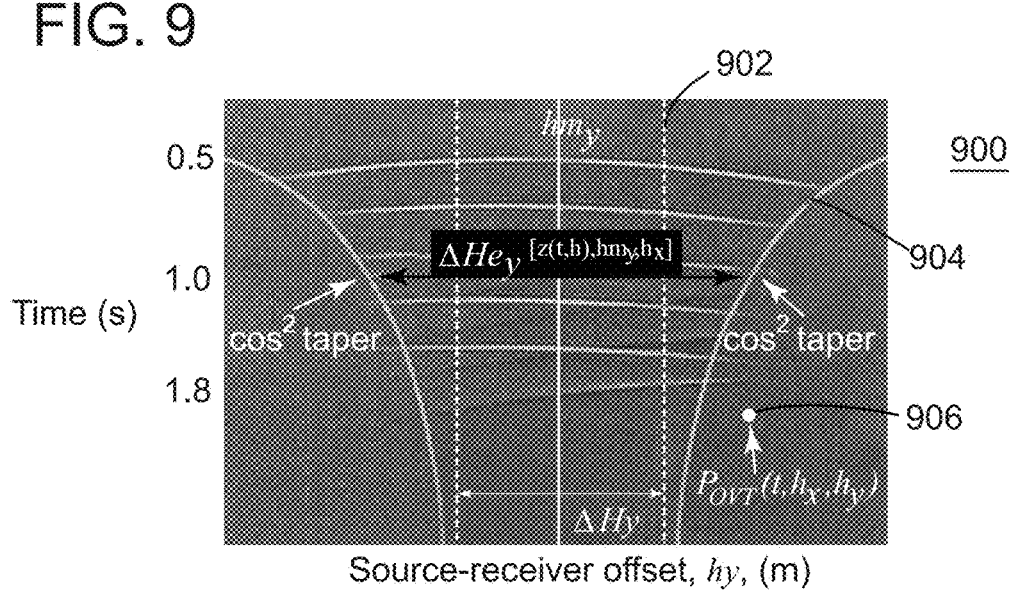
FIG. 9 is a cross-sectional illustration of the transition taper of the offset vector tile gather.

Referring to FIG. 9, a $[h_y, t]$ cross-section, i.e., constant $h_x$ through a modified OVT gather is illustrated 900 with the standard OVT gather size $\Delta H_y$ also shown 902. The modified OVT gather has a time dependent mute line $\Delta He_y$ 904 or taper. The outer traces seismic traces in the OVT gather that are outside $\Delta He_y$ are muted. A trace sample $P_{OVT}(t, h_x, h_y)$ 906 is muted if $|h_y - hm_y| > \Delta He_y[z(t, h), hm_y, h_x]/2$. The boundary between muted, outer seismic traces, and non-muted, inner seismic traces, parts of the modified OVT gather is a taper zone 904 having a pre-defined taper, for example with a $\cos^2$ taper, which ensures a summation to unity in the image when all the OVT gathers for an offset class are migrated and additionally reduces the seismic receiver line footprints in the 3D seismic image.

In addition to the muting and tapering of the modified OVT gather, distortions in the illumination density of the subsurface are corrected. In one embodiment, each seismic trace in a given OVT gather is scaled with the factor $[R_x(z, h)R_y(z, h)]^{-1}$. In the special case of symmetrical ray paths $R_x = R_y = 1$ the scaling factor is 1, as expected.

Figure 10:
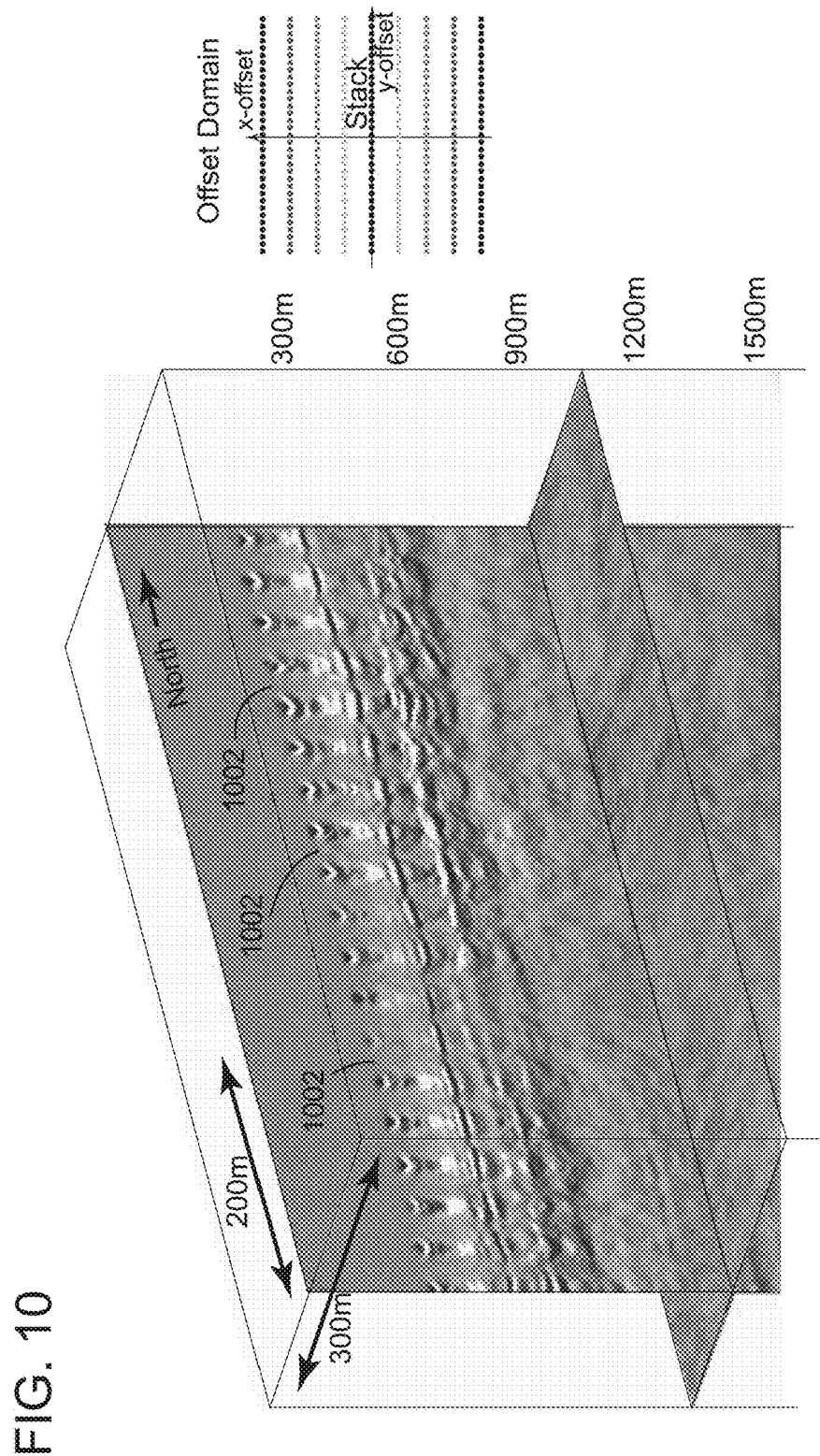
FIG. 10 is a vertical slice of a subsurface image showing the footprint of seismic receiver lines.
Figure 11:
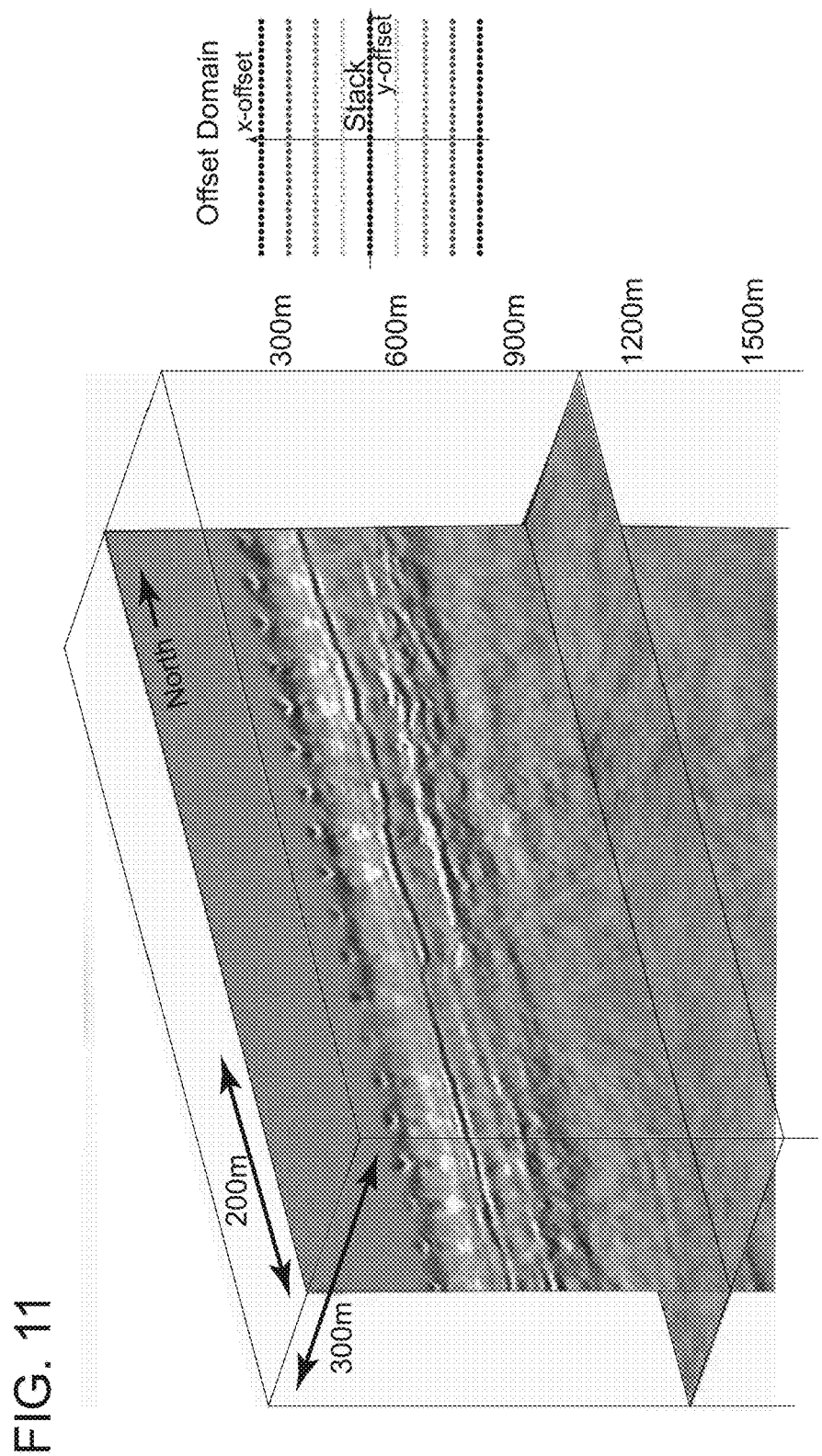
FIG. 11 is a vertical slice of the subsurface image with corrections for the footprint of the seismic receiver lines.
Figure 12:
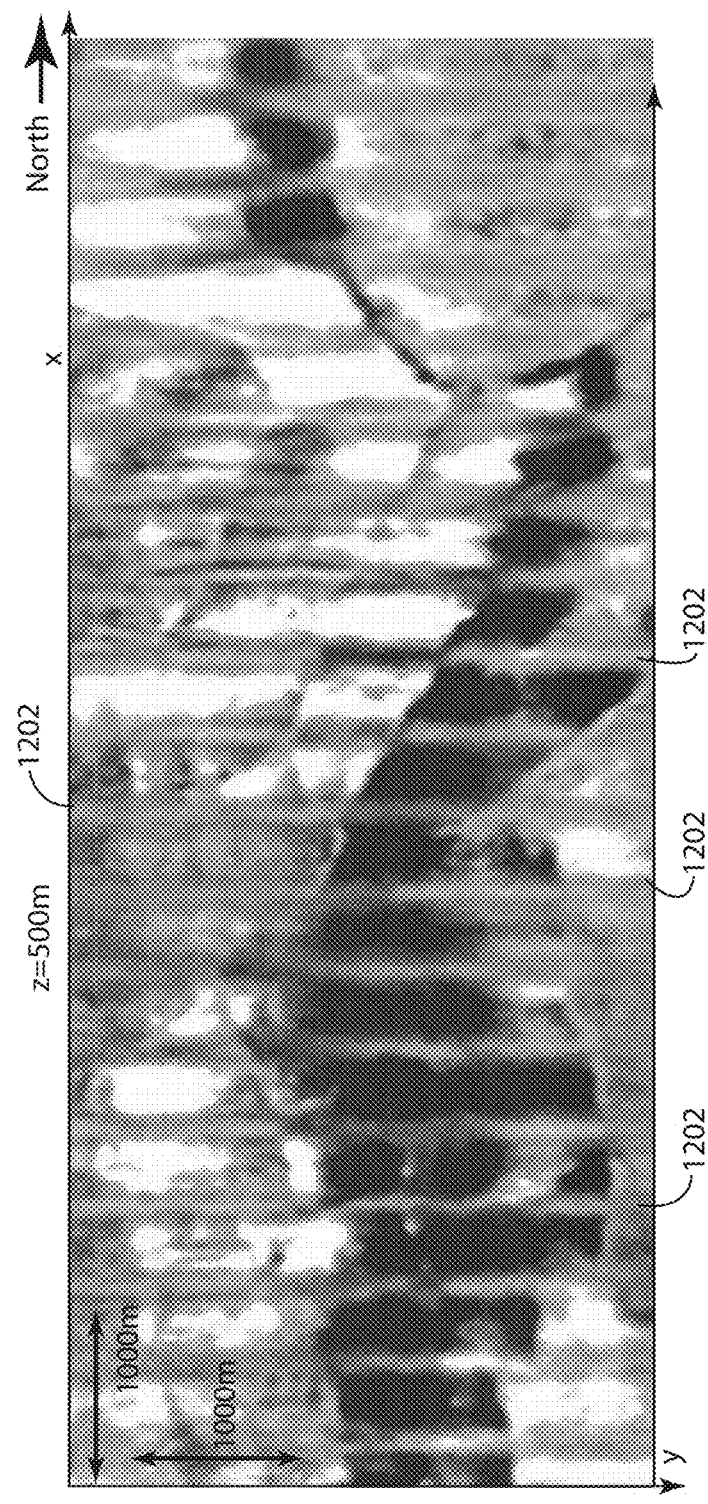
FIG. 12 is a horizontal slice of a subsurface image showing the footprint of seismic receiver lines.
Figure 13:
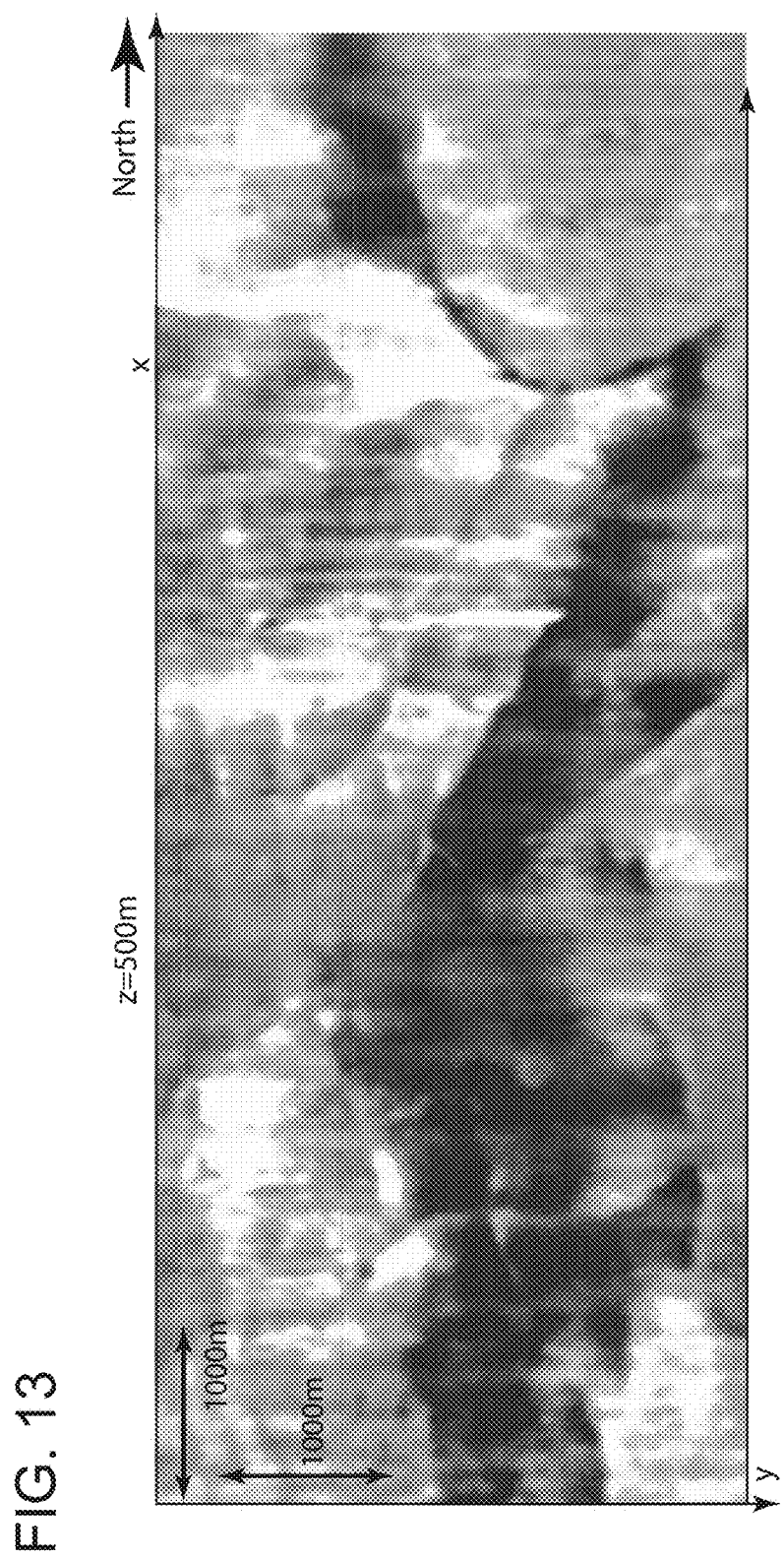
FIG. 13 is a horizontal slice of the subsurface image with corrections for the footprint of the seismic receiver lines.

The improvements in the generated image of the subsurface in which the footprints of the seismic receiver lines are eliminated can be illustrated by looking a 2d slices, either vertical or horizontal slices, through the 3D image of the subsurface. Referring to FIG. 10, a vertical slice of the subsurface is illustrated in which the footprints are clearly visible as gaps 1002 in the image that extend downward into the subsurface. Using the modified OVT gathers, these gaps can be filled in, in particular as the image extend down into the subsurface, eliminating the footprints and producing the corrected vertical slice illustrated in FIG. 11. Referring to FIG. 12, a horizontal slice of the subsurface is illustrated in which the gaps 1202 associated with the footprints extend through the subsurface at that depth. Using the modified OVT gathers, these gaps can be filled in eliminating the footprints and producing the corrected horizontal slice illustrated in FIG. 13.

Imaging converted wave and deep-water ocean-bottom data produces migration artifacts from uneven illumination achieved with regular acquisition geometries. Embodiments are directed to methods to reduce these artefacts by a time-dependent extension and weighting of the OVT gathers. The transformation functions are velocity-model dependent, can be computed analytically or by ray tracing, and assume that the 3D model is locally 1D. The field-data example demonstrates significant improvement in imaging the shallow and intermediate subsurface using this method.

Figure 14:
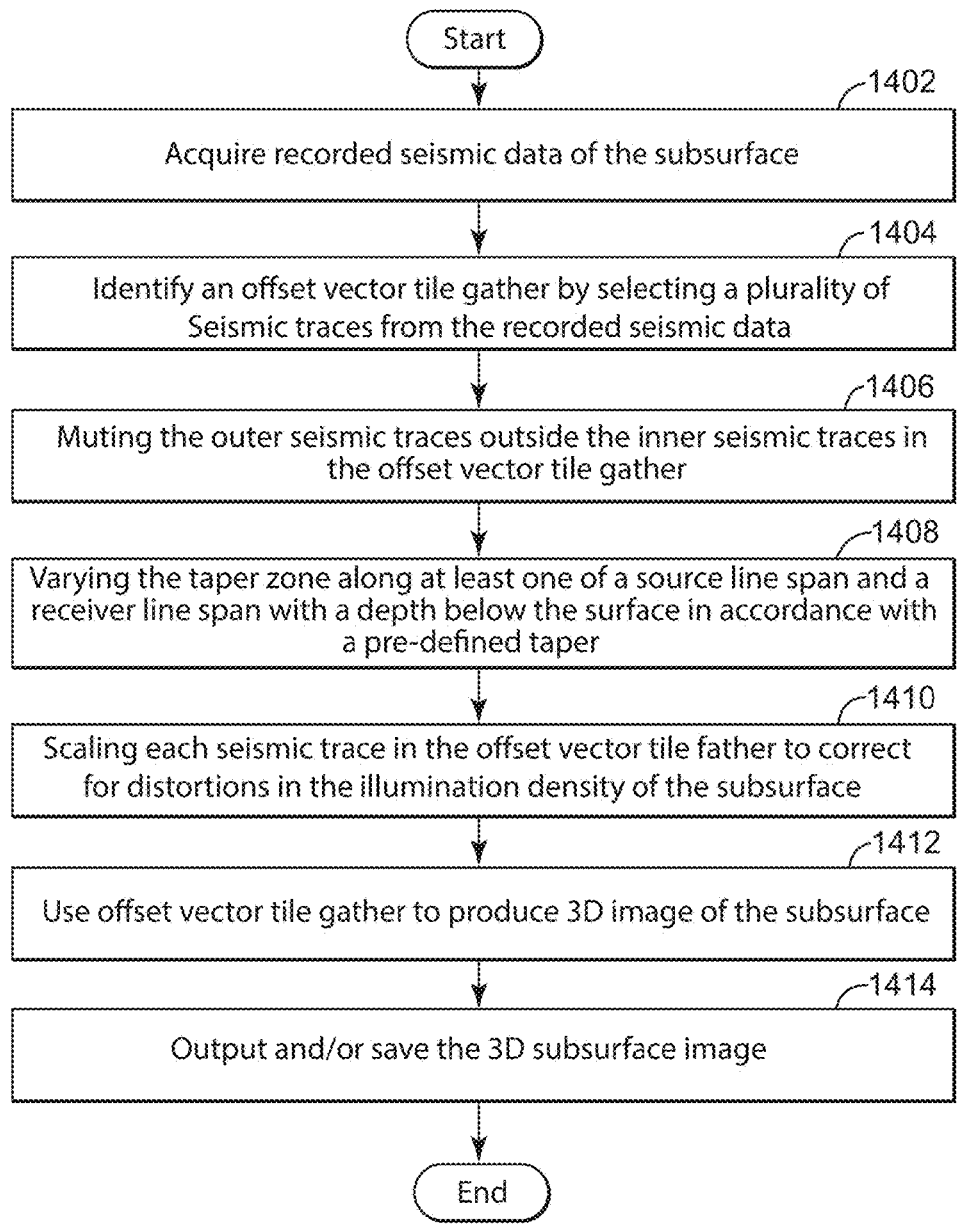
FIG. 14 is a flowchart of an embodiment of a method for using an offset vector tile gather to image a subsurface.

Referring now to FIG. 14, exemplary embodiments are directed to a method 1400 for using an offset vector tile gather to image the subsurface. Seismic data of the subsurface are acquired 1402. Suitable methods for acquiring seismic data are known and available in the art and include reading recorded seismic data from a database or conducting a land-based or marine-based seismic survey to generate the seismic data. In one embodiment, the seismic data are generated by seismic sources defining a plurality of source lines having a source line distance between adjacent source lines and recorded at a plurality of seismic data receivers disposed in a plurality of receiver lines having a receiver line distance between adjacent receiver lines. The seismic data include a plurality of seismic traces, and each seismic trace is associated with a given seismic source and a given seismic receiver pair. Each seismic trace also defines and includes a common midpoint at a surface and a reflection point at a given depth below the surface associated with the given seismic source and the given seismic receiver.

An offset vector tile gather is then identified by selecting a plurality of seismic traces from recorded seismic data 1404. The offset vector tile gather contains a plurality of reflection points at given depths below a surface of the subsurface. Each reflection point in the plurality a reflection points is disposed in a given seismic trace in the plurality of seismic traces, and each given seismic trace extends from a seismic source located in one of a plurality of seismic source lines to a seismic receiver located in one of a plurality of seismic receiver lines. In one embodiment, each seismic source associated with the plurality of seismic traces is located in a single common source line in the plurality of source lines, and each seismic receiver associated with the plurality of seismic traces is located in a single common receiver line in the plurality of seismic receiver lines. Therefore, a given seismic trace is associated with a particular seismic source and seismic receiver pair. This seismic trace contains a plurality of reflections from reflectors at different depths below the surface of the subsurface. Each reflection in the given seismic traces is associated with a given seismic ray. Therefore, the given seismic trace includes a plurality of seismic traces, one for each reflecting surface. Therefore, seismic rays are computed for each depth level in the subsurface. These seismic rays are used to compute the mute and weight functions, which are dependent on both the time of the seismic trace and the offset of the seismic trace in the OVT.

The plurality of reflection points defines an offset vector tile having a source line span parallel to the plurality of seismic source lines and a receiver line span parallel to the plurality of seismic receiver lines. The source line span is equal to or greater than a distance between adjacent seismic receiver lines in the plurality of seismic receiver lines, and the receiver line span is less than a distance between adjacent seismic source lines in the plurality of seismic source lines. Therefore, the modified OVT gather is generated.

In addition to selecting a single OVT gather, in one embodiment, a plurality of offset vector tile gathers is selected in order to define a plurality of non-overlapping offset vector tiles. Each offset tile is associated with one of the offset vector tile gathers. In one embodiment, a unique plurality of seismic traces from the recorded seismic data for each offset tile gather, such that each offset vector tile gather comprising a unique plurality of reflection points at given depths below a surface of the subsurface.

Since the recorded seismic data include both the plurality of seismic traces within the offset vector tile gather and additional seismic traces outside the offset vector tile gather. In addition, the plurality of seismic traces within the offset vector tile gather are divided into inner seismic traces and outer seismic traces. The outer seismic traces surround the inner seismic traces, i.e., have higher x and y values when viewed in an $h_x$–$h_y$ plane through which all of the seismic traces pass. This $h_x$–$h_y$ plane is perpendicular to depth or time. In one embodiment, outer seismic traces in the offset vector tile gather are muted 1406. This yields a uniform subsurface illumination at each time level in the subsurface. The inner seismic traces are located in an inner, non-muted zone, and the outer seismic traces are located in an outer, muted zone. Disposed between the inner seismic traces and the outer seismic traces is non-muted zone of seismic traces and the muted zone of seismic traces is a taper zone. In one embodiment, muting the outer seismic traces further includes varying the taper zone along at least one of the source line span and the receiver line span with a depth below the surface of the subsurface in accordance with a pre-defined taper 1408. Suitable pre-defined tapers include, but are not limited to a cosine squared taper.

In one embodiment, each given seismic trace associated with a source-receiver pair includes a plurality of rays from reflectors at different depths each with a common midpoint between the seismic source and the seismic receiver. Each ray also has a common reflection point (CRP). The source line span and the receiver line span to ensure uniform subsurface illumination for a particular depth depends on the ratio between the density of reflection points and the density of common midpoints. In another embodiment, each seismic trace in the offset vector tile gather is scaled to correct for distortions in the illumination density of the subsurface 1410. Therefore, in one embodiment, each given seismic trace has a common midpoint between the seismic source and the seismic receiver associated with the given seismic trace, and each seismic trace in the plurality of seismic traces is scaled by an inverse of a product between a ratio of density of reflection points and density of common midpoints for the source line span and the receiver line span. The ratio of density of reflection points and density of common midpoints is a function of depth below the surface of the subsurface and an offset between seismic sources and seismic receivers.

The offset vector tile gather is used to produce a three dimensional image of the subsurface 1412. Suitable methods for using the offset vector tile gather to produce the three dimensional image include, but are not limited to, migration such as Kirchhoff migration. When a plurality of offset vector tile gathers are generated, this plurality of offset vector tile gathers is used to produce the three dimensional image of the subsurface. The resulting 3D image of the subsurface can then be displayed or saved for further processing 1414.

Embodiments provide an improvement conventional CMP based COV binning that create footprint and migration noise for acquisitions where sources and receivers are at different depth levels or where PS waves are imaged. The OVT muting and weighting overcomes these problems by binning acquired seismic data in such a way that a uniform, or near uniform, illumination is obtained at all depth levels in the model beneath a certain given shallow depth level. The number of traces in an OVT gather are adjusted, and a mute based on the depth- and offset dependent CMP-CRP difference computed by ray tracing is created, improving the CRP coverage considerably. These steps are performed on pre-migration data and create gathers that can be migrated, for example, by Kirchhoff migration or depth migration. Embodiments can be used for any acquisition technique and are particularly useful for Ocean Bottom Cable (OBC) or Ocean Bottom Nodes (OBN) acquisitions.

Figure 15:
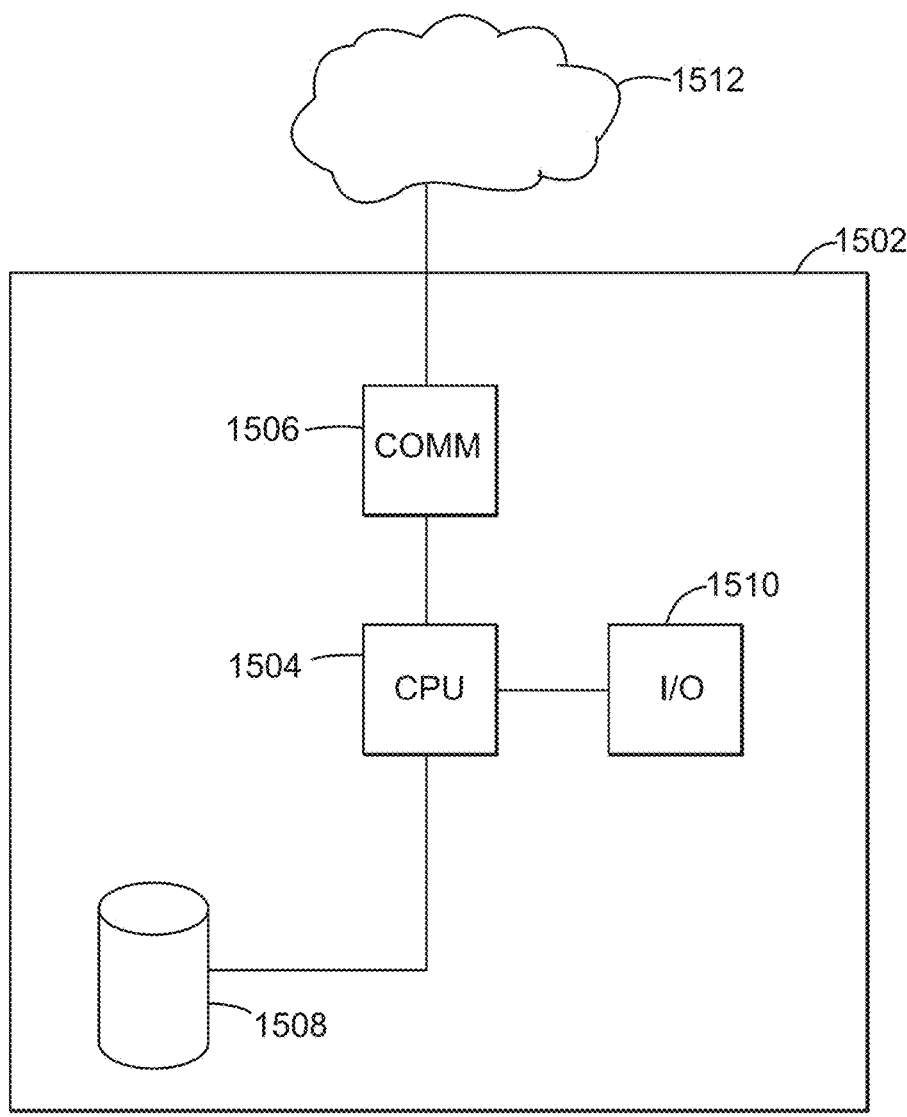
FIG. 15 is a schematic representation of an embodiment of a computing system for using an offset vector tile gather to image a subsurface.

Referring now to FIG. 15, exemplary embodiments are directed to a computing system 1500 for using an offset vector tile gather to image a subsurface. In one embodiment, a computing device for performing the calculations as set forth in the above-described embodiments may be any type of computing device capable of obtaining, processing and communicating multi-vintage seismic data associated with seismic surveys conducted at different time periods. The computing system 1500 includes a computer or server 1502 having one or more central processing units 1504 in communication with a communication module 1506, one or more input/output devices 1510 and at least one storage device 1508.

The communication module is used to obtain seismic data recorded from a subsurface. These recorded seismic data can be obtained, for example, through the input/output devices. The recorded seismic data for the subsurface are stored in the storage device. The input/output device can also be used to communicate or display the resulting three dimensional image of the subsurface, for example, to a user of the computing system.

The processer is in communication with the communication module and storage device and is configured to define an offset vector tile gather by selecting a plurality of seismic traces from the recorded seismic data. Each trace in the offset vector tile gather includes a plurality of reflections and corresponding reflection points at given depths below a surface of the subsurface. Each reflection point in the plurality a reflection points is associated to a particular time t in a given seismic trace in the plurality of seismic traces, where each given seismic trace extends from a seismic source located in one of a plurality of seismic source lines to a seismic receiver located in one of a plurality of seismic receiver lines. The plurality of reflection points defines an offset vector tile having a source line span parallel to the plurality of seismic source lines and a receiver line span parallel to the plurality of seismic receiver lines. The source line span is equal to or greater than a distance between adjacent seismic receiver lines in the plurality of seismic receiver lines, and the receiver line span is less than a distance between adjacent seismic source lines in the plurality of seismic source lines. The processor is further configured to use the offset vector tile gather to produce a three dimensional image of the subsurface.

Suitable embodiments for the various components of the computing system are known to those of ordinary skill in the art, and this description includes all known and future variants of these types of devices. The communication module provides for communication with other computing systems, databases and data acquisition systems across one or more local or wide area networks 1512. This includes both wired and wireless communication. Suitable input/output devices include keyboards, point and click type devices, audio devices, optical media devices and visual displays.

Suitable storage devices include magnetic media such as a hard disk drive (HDD), solid state memory devices including flash drives, ROM and RAM and optical media. The storage device can contain data as well as software code for executing the functions of the computing system and the functions in accordance with the methods described herein. Therefore, the computing system 500 can be used to implement the methods described above associated with using an offset vector tile gather to image a subsurface. Hardware, firmware, software or a combination thereof may be used to perform the various steps and operations described herein.

Methods and systems in accordance with exemplary embodiments can be hardware embodiments, software embodiments or a combination of hardware and software embodiments. In one embodiment, the methods described herein are implemented as software. Suitable software embodiments include, but are not limited to, firmware, resident software and microcode. In addition, exemplary methods and systems can take the form of a computer program product accessible from a computer-usable or computer-readable medium providing program code for use by or in connection with a computer, logical processing unit or any instruction execution system. In one embodiment, a machine-readable or computer-readable medium contains a machine-executable or computer-executable code that when read by a machine or computer causes the machine or computer to perform a method for using an offset vector tile gather to image a subsurface and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages.

As used herein, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums and include non-transitory computer-readable mediums. Suitable computer-readable mediums include, but are not limited to, a semiconductor or solid state memory, magnetic tape, a removable computer diskette, a random access memory (RAM), a read-only memory (ROM), a rigid magnetic disk and an optical disk. Suitable optical disks include, but are not limited to, a compact disk-read only memory (CD-ROM), a compact disk-read/write (CD-R/W) and DVD.

The disclosed exemplary embodiments provide a computing device, software and method for method for using an offset vector tile gather to image a subsurface. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a geophysics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for using an offset vector tile gather to image a subsurface, the method comprising:
   recording seismic data carrying structural information about the subsurface;
   defining an offset vector tile gather by selecting a plurality of seismic traces from the recorded seismic data, each seismic trace in an offset vector tile comprising reflections from a plurality of subsurface reflectors such that the offset vector tile gather comprises a plurality of reflection points at given depths below a surface of the subsurface, each reflection point in the plurality of reflection points being disposed in a given seismic trace in the plurality of seismic traces where each given seismic trace extends from a seismic source located in one of a plurality of seismic source lines to a seismic receiver located in one of a plurality of seismic receiver lines, the plurality of reflection points defining an offset vector tile comprising a source line span parallel to the plurality of seismic source lines and a receiver line span parallel to the plurality of seismic receiver lines, the source line span being equal to or greater than a distance between adjacent seismic receiver lines in the plurality of seismic receiver lines and the receiver line span being less than a distance between adjacent seismic source lines in the plurality of seismic source lines; and
   using the offset vector tile gather to produce a three dimensional image of the subsurface that has suppressed artifacts associated with footprint of seismic cables or nodes.

2. The method of claim 1, wherein:
   selecting the offset vector tile gather further comprises selecting a plurality of offset vector tile gathers to define a plurality of non-overlapping offset vector tiles, each offset tile associated with one of the offset vector tile gathers; and
   using the offset vector tile gather further comprises using the plurality of offset vector tile gathers to produce the three dimensional image of the subsurface.

3. The method of claim 2, wherein selecting the plurality of offset tile gathers further comprises selecting a unique plurality of seismic traces from the recorded seismic data for each offset tile gather, each offset vector tile gather comprising a unique plurality of reflection points at given depths below a surface of the subsurface.

4. The method of claim 1, wherein each seismic source associated with the plurality of seismic traces is located in a single common source line in the plurality of source lines and each seismic receiver associated with the plurality of seismic traces is located in a single common receiver line in the plurality of seismic receiver lines.

5. The method of claim 1, wherein:
   the plurality of seismic traces within the offset vector tile gather comprise inner seismic traces and outer seismic traces, the outer seismic traces surrounding the inner seismic traces; and
   the method further comprises muting the outer seismic traces.

6. The method of claim 5, wherein:
   the plurality of seismic traces further comprises a taper zone between the inner seismic traces and the outer seismic traces; and
   muting the outer seismic traces further comprises varying the taper zone along at least one of the source line span and the receiver line span with a depth below the surface of the subsurface in accordance with a pre-defined taper.

7. The method of claim 6, wherein the pre-defined taper comprises a cosine squared taper.

8. The method of claim 1, wherein:
   each given seismic trace further comprises a common midpoint between the seismic source and the seismic receiver associated with the given seismic trace; and
   the method further comprises scaling each seismic trace in the plurality of seismic traces by an inverse of a product between a ratio of density of reflection points and density of common midpoints for the source line span and the receiver line span, where the ratio of density of reflection points and density of common midpoints comprises a function of depth below the surface of the subsurface and an offset between seismic sources and seismic receivers.

9. A non-transitory computer-readable medium containing computer-executable code that when read by a computer causes the computer to perform a method for using an offset vector tile gather to image a subsurface from seismic data carrying structural information about the subsurface, the method comprising:
   defining an offset vector tile gather by selecting a plurality of seismic traces from the recorded seismic data, each seismic trace in the offset vector tile comprising reflections from a plurality of subsurface reflectors such that the offset vector tile gather comprises a plurality of reflection points at given depths below a surface of the subsurface, each reflection point in the plurality a reflection points being disposed in a given seismic trace in the plurality of seismic traces where each given seismic trace extends from a seismic source located in one of a plurality of seismic source lines to a seismic receiver located in one of a plurality of seismic receiver lines, the plurality of reflection points defining an offset vector tile comprising a source line span parallel to the plurality of seismic source lines and a receiver line span parallel to the plurality of seismic receiver lines, the source line span being equal to or greater than a distance between adjacent seismic receiver lines in the plurality of seismic receiver lines and the receiver line span being less than a distance between adjacent seismic source lines in the plurality of seismic source lines; and using the offset vector tile gather to produce a three dimensional image of the subsurface that has suppressed artifacts associated with footprint of seismic cables or nodes.

10. The non-transitory computer-readable medium of claim 9, wherein:
   selecting the offset vector tile gather further comprises selecting a plurality of offset vector tile gathers to define a plurality of non-overlapping offset vector tiles, each offset tile associated with one of the offset vector tile gathers; and
   using the offset vector tile gather further comprises using the plurality of offset vector tile gathers to produce the three dimensional image of the subsurface.

11. The non-transitory computer-readable medium of claim 10, wherein selecting the plurality of offset tile gathers further comprises selecting a unique plurality of seismic traces from the recorded seismic data for each offset tile gather, each offset vector tile gather comprising a unique plurality of reflection points at given depths below a surface of the subsurface.

12. The non-transitory computer-readable medium of claim 9, wherein:
   the plurality of seismic traces within the offset vector tile gather comprise inner seismic traces and outer seismic traces, the outer seismic traces surrounding the inner seismic traces; and
   the method further comprises muting the outer seismic traces.

13. The non-transitory computer-readable medium of claim 12, wherein:
   the plurality of seismic traces further comprises a taper zone between the inner seismic traces and the outer seismic traces; and
   muting the outer seismic traces further comprises varying the taper zone along at least one of the source line span and the receiver line span with a depth below the surface of the subsurface in accordance with a pre-defined taper.

14. The non-transitory computer-readable medium of claim 13, wherein the pre-defined taper comprises a cosine squared taper.

15. The non-transitory computer-readable medium of claim 9, wherein:
   each given seismic trace further comprises a common midpoint between the seismic source and the seismic receiver associated with the given seismic trace; and
   the method further comprises scaling each seismic trace in the plurality of seismic traces by an inverse of a product between a ratio of density of reflection points and density of common midpoints for the source line span and the receiver line span, where the ratio of density of reflection points and density of common midpoints comprises a function of depth below the surface of the subsurface and an offset between seismic sources and seismic receivers.

16. A computing system for using an offset vector tile gather to image a subsurface, the computing system comprising:
   a storage device comprising recorded seismic data carrying structural information about the subsurface; and
   a processor in communication with the storage device and configured to:
      define an offset vector tile gather by selecting a plurality of seismic traces from the recorded seismic data, each seismic trace in the offset vector tile comprising reflections from a plurality of subsurface reflectors such that the offset vector tile gather comprising a plurality of reflection points at given depths below a surface of the subsurface, each reflection point in the plurality a reflection points being disposed in a given seismic trace in the plurality of seismic traces where each given seismic trace extends from a seismic source located in one of a plurality of seismic source lines to a seismic receiver located in one of a plurality of seismic receiver lines, the plurality of reflection points defining an offset vector tile comprising a source line span parallel to the plurality of seismic source lines and a receiver line span parallel to the plurality of seismic receiver lines, the source line span being equal to or greater than a distance between adjacent seismic receiver lines in the plurality of seismic receiver lines and the receiver line span being less than a distance between adjacent seismic source lines in the plurality of seismic source lines; and
      use the offset vector tile gather to produce a three dimensional image of the subsurface that has suppressed artifacts associated with footprint of seismic cables or nodes.

17. The computing system of claim 16, wherein the processor is further configured to:
   select a plurality of offset vector tile gathers to define a plurality of nonoverlapping offset vector tiles by selecting a unique plurality of seismic traces from the recorded seismic data for each offset tile gather, each offset vector tile gather comprising a unique plurality of reflection points at given depths below a surface of the subsurface and each offset tile associated with one of the offset vector tile gathers; and
   use the plurality of offset vector tile gathers to produce the three dimensional image of the subsurface.

18. The computing system of claim 16, wherein:
   each given seismic trace further comprises a common midpoint between the seismic source and the seismic receiver associated with the given seismic trace; and
   the processor is further configured to scale each seismic trace in the plurality of seismic traces by an inverse of a product between a ratio of density of reflection points and density of common midpoints for the source line span and the receiver line span, where the ratio of density of reflection points and density of common midpoints comprises a function of depth below the surface of the subsurface and an offset between seismic sources and seismic receivers.

19. The computing system of claim 18, wherein:
   the plurality of seismic traces further comprises inner seismic traces, outer seismic traces and a taper zone between the inner seismic traces and the outer seismic traces, the outer seismic traces surrounding the inner seismic traces; and
   the processor is further configured to mute the outer seismic traces by varying the taper zone along at least one of the source line span and the receiver line span with a depth below the surface of the subsurface in accordance with a pre-defined taper.

20. The computing system of claim 16, wherein:
   each given seismic trace further comprises a common midpoint between the seismic source and the seismic receiver associated with the given seismic trace; and
   the processor is further configured to scale each seismic trace in the plurality of seismic traces by an inverse of a product between a ratio of density of reflection points and density of common midpoints for the source line span and the receiver line span, where the ratio of density of reflection points and density of common midpoints comprises a function of depth below the surface of the subsurface and an offset between seismic sources and seismic receivers.

* * * * *